Dec. 26, 1933.                    W. L. BEALL                   1,940,992
                     IMPLEMENT ATTACHMENT FOR TRACTORS
                     Filed Nov. 22, 1930          4 Sheets-Sheet 1
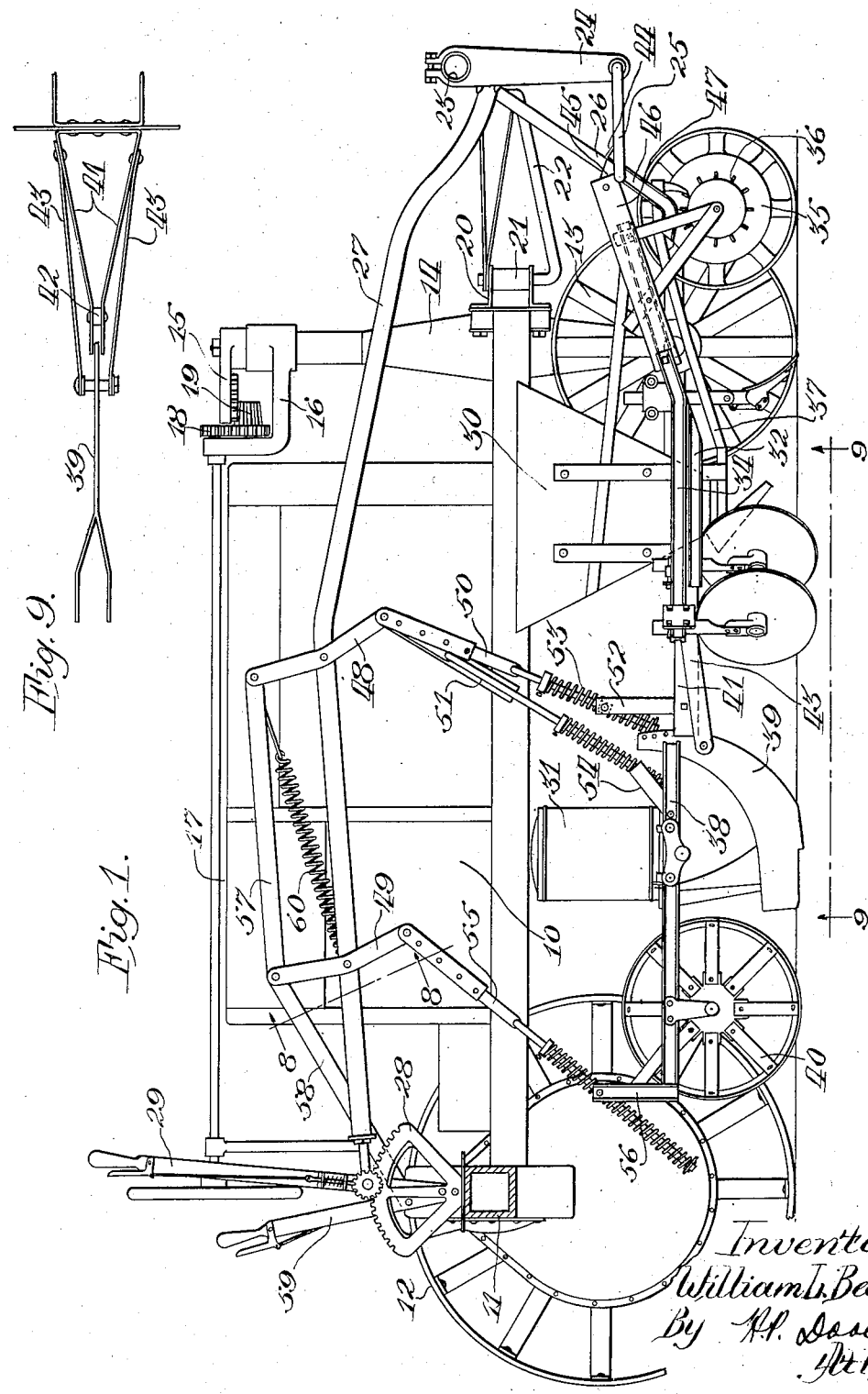

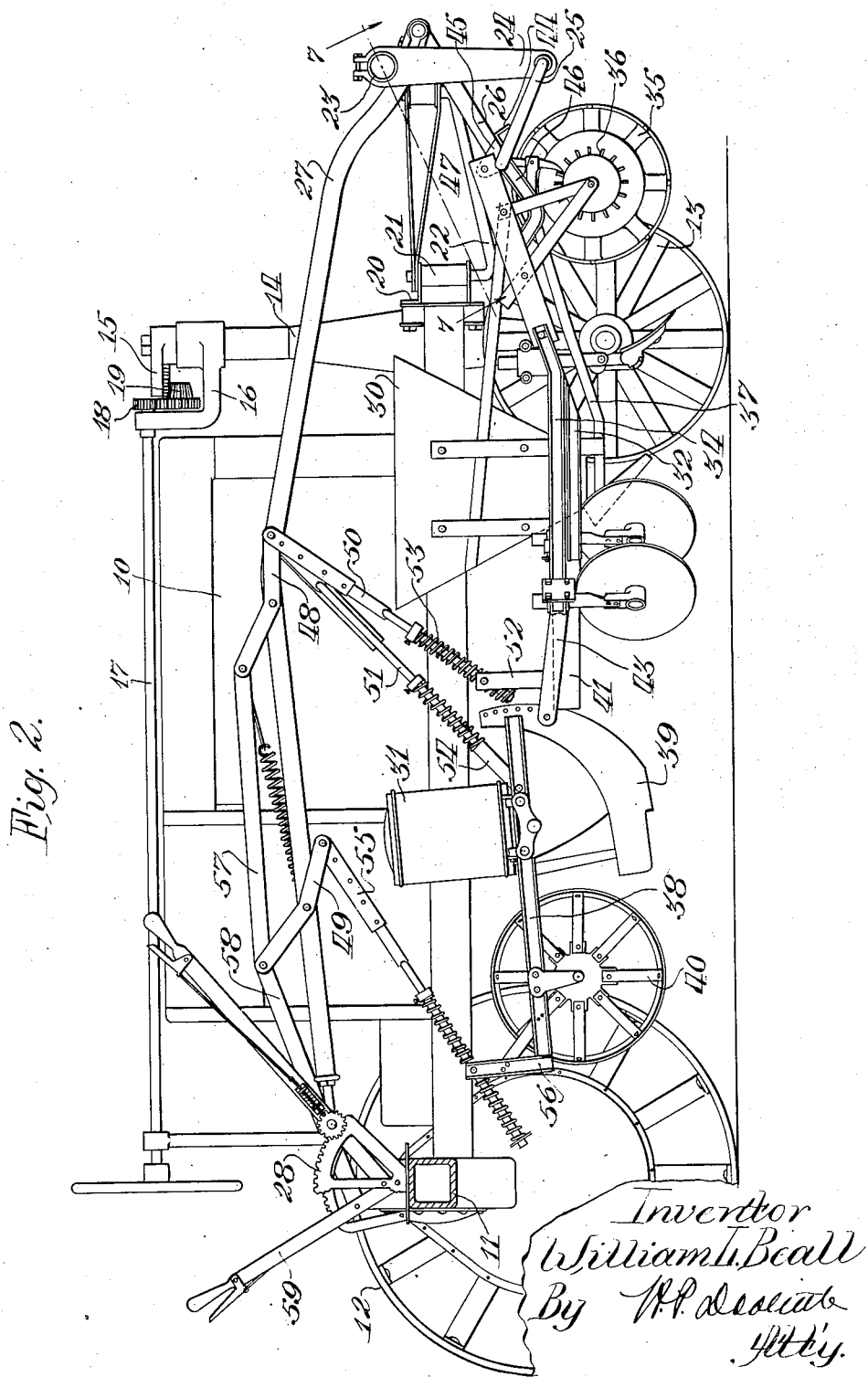

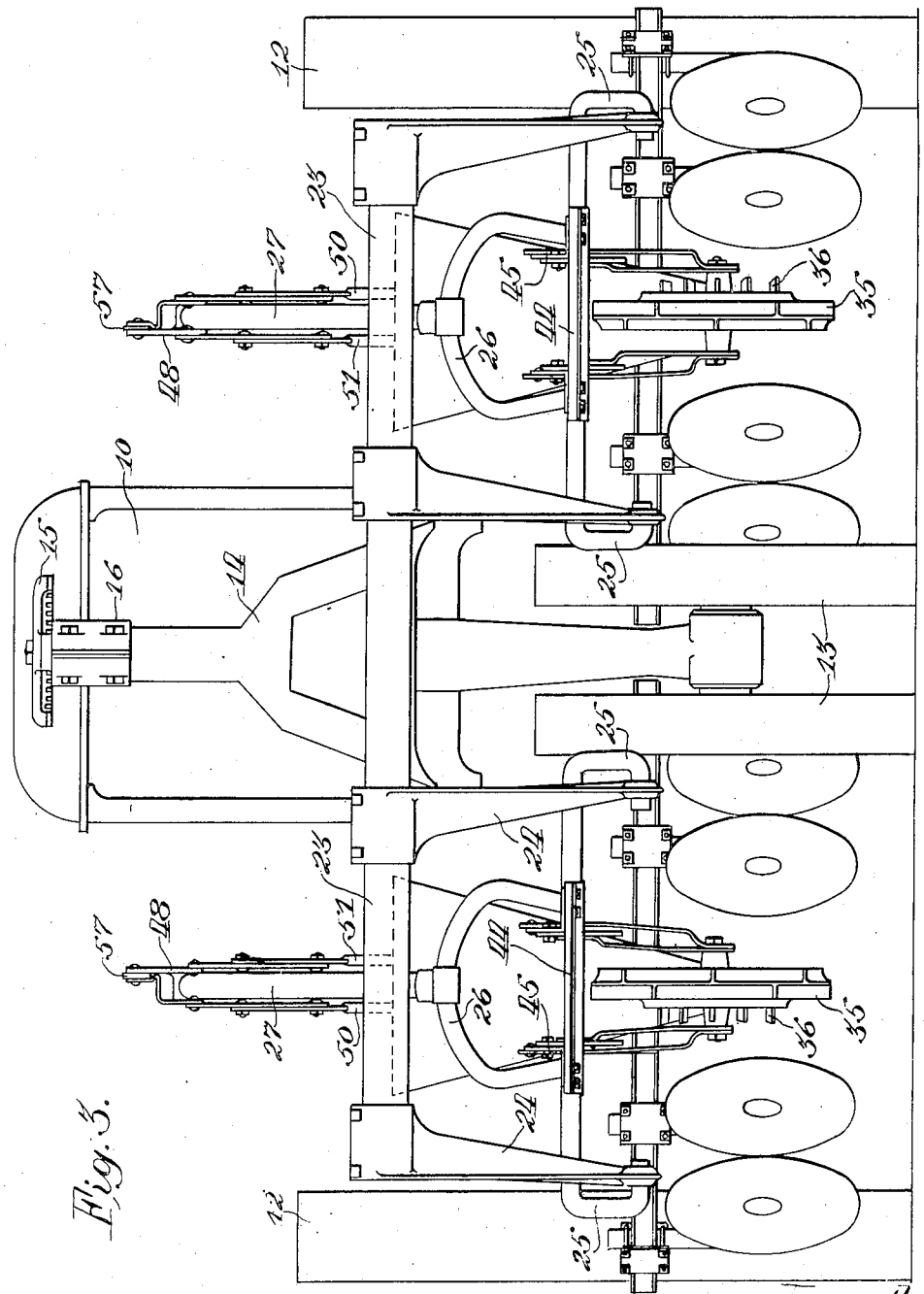

Dec. 26, 1933.  W. L. BEALL  1,940,992
IMPLEMENT ATTACHMENT FOR TRACTORS
Filed Nov. 22, 1930   4 Sheets-Sheet 4
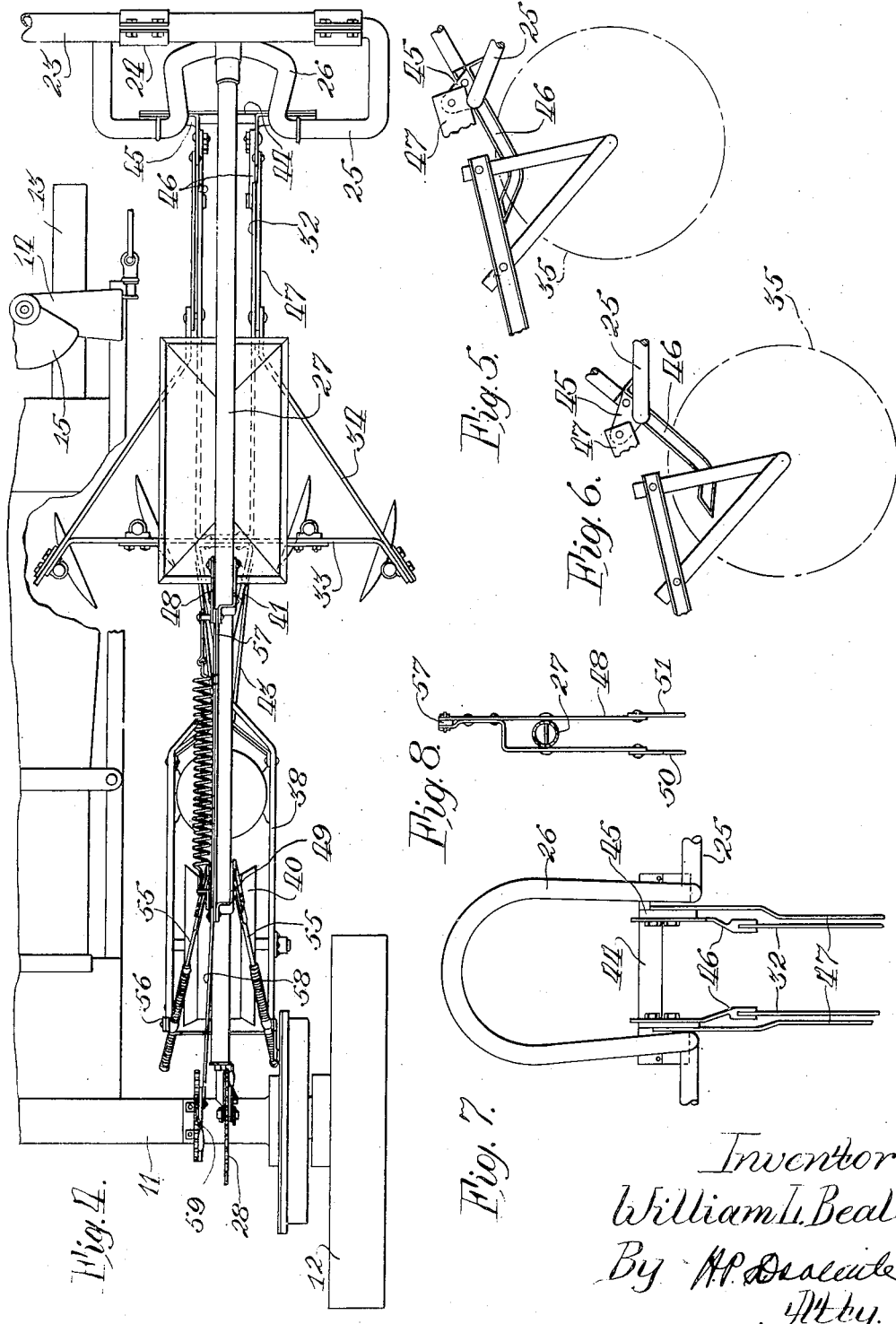
Inventor
William L. Beall Patented Dec. 26, 1933

1,940,992

UNITED STATES PATENT OFFICE 1,940,992

IMPLEMENT ATTACHMENT FOR TRACTORS

William L. Beall, Chattanooga, Tenn., assignor to International Harvester Company, a corporation of New Jersey Application November 22, 1930
Serial No. 497,420

5 Claims. (Cl. 111—59)

The present invention relates to self-propelled agricultural implements, and more particularly to implements mounted forwardly and at the side of a tractor.

The main objects of the invention are to provide an arrangement of supporting and connecting means permitting a plurality of planting devices, or similar units to be connected in tandem relation at one or both sides of a tractor, where the work can be observed from the operator's station on the rear end of the tractor, and to provide lift controls and pressure means simultaneously effective on all the frames and operable from the operator's station.

The foregoing and other objects and advantages are attained by the combination of instrumentalities and details of construction hereinafter described and claimed and illustrated by the accompanying drawings, where:

Figure 1 is a side elevation of a tractor and implement organization embodying the invention, the implement frames being shown in lowered position;

Figure 2 is a similar view with the implement frames raised;

Figure 3 is a front view of the machine shown in Figures 1 and 2;

Figure 4 is a plan view showing one lateral half of the machine;

Figures 5 and 6 are detail side views of parts of the front end and draft connection of the front implement frame, showing the positions assumed when the frames are in raised and in lowered position;

Figure 7 is a detail plan view of parts of the draft and lifting connection of the front implement frame, viewed on line 7—7, Figure 2;

Figure 8 is a detail of an auxiliary adjusting lever, viewed on line 8—8, Figure 1; and, Figure 9 is a detail underside view, showing the relation of parts at the connection between the frames, as viewed on line 9—9, Figure 1.

The preferred construction illustrated includes a tractor of the row-crop type comprising a narrow body 10 supported at the rear on a transversely extended arched axle structure 11, which is supported on widely spaced traction wheels 12. The forward end of the tractor body is carried on a steering truck 13, which preferably has two closely positioned wheels which travel a path midway between the traction wheels 12, the wheel arrangement being such that the tractor can straddle the spaces needed for two plant rows of such crops as corn or cotton. The side beams of the body 10 of the tractor are joined at the front end by a cross-head 14, which has a vertical, tubular portion in which the standard of the truck 13 is swiveled. The upper end of the standard has clamped to it a gear sector 15 and the upper end of the tubular portion of cross-head 14 has fixed to it a bracket 16, on which the front end of a steering shaft 17 is journaled. The steering shaft has a steering wheel on its rear end and a pinion 18 at its front end which meshes with suitable gears 19 journaled on a stub shaft carried by the bracket 16, which transmit motion to the sector 15 and thereby to the truck. The tractor is that more particularly described in the patent to Benjamin et al. 1,667,371 of April 24, 1928, with which the structures to be described are designed to cooperate.

The forward end of the tractor at each side is equipped with detachable supporting brackets 20 formed with vertical sockets 21 in which the rear ends of forwardly extending supports 22 are mounted. These supports (only one of which is shown) are of the construction shown in the prior patent above referred to, and in this instance are held fixed as against lateral swinging movement. The forward ends of the supports 22 carry a transverse tubular draft member 23, which projects laterally at each side of the tractor body. This draft member has secured to each of its projecting ends a pair of spaced depending hangers 24 and, as the structures connected to these hangers are duplicated at each side of the tractor, only one will be described.

The spaced hangers 24 are located at each side of one of the plant row spaces straddled by the tractor. The lower ends of the hangers are provided with transverse bearing openings pivotally receiving rearwardly extending angular arms 25 forming part of a crank-like supporting and draft member having a central upwardly and forwardly inclined arched part 26. The center of the arch 26 has pivotally connected to it the forward end of a longitudinally extending adjusting shaft 27, which is preferably arched upwardly, as illustrated, and the rear end of which is supported on the rear axle structure of the tractor in a manner permitting fore and aft shifting adjustment of this shaft. The preferred shifting connection comprises a hand lever 29, to which the rear end of shaft 27 is pivoted. This lever is pivoted on a sector bracket 28 clamped to the tractor axle and the lever is provided with the usual latch mechanism, which serves to lock the lever at adjustment. It will be obvious that fore and aft shifting movement of the shaft 27 will rock the supporting member on the pivot of the arms 25, causing the rearmost portion thereof to move on a vertical arc.

The implements herein shown as drawn and controlled by the structure above described consist of a forward fertilizer dispensing unit 30 and a rear seed dispensing unit 31. The forward unit comprises a rigid frame (Figure 4) formed of spaced side bars 32, and an extended rear cross-bar 33 joined to the side bars by braces 34. This frame carries the usual hopper, furrow former and covering disks, and is supported on a forward wheel 35 when in lowered or operating position. This wheel is shown as provided with tappets 36 cooperating with a shaker bar 37, which actuates the fertilizer dispensing device.

The rear unit comprises a rigid frame having side bars 38, which converge forwardly and are secured to a furrow opening runner 39 above which the seed hopper is mounted. The rear of the frame is supported on a covering wheel 40, which may drive the seed dispensing device in any conventional manner. To keep the frames in alignment and hold the rear frame upright, the cross-bar 33 (Figure 9) on the front frame has secured to it a yoke bar, the arms 41 of which converge rearwardly where they are united, as at 42, and spaced sufficiently at the free ends to allow the forward edge of the runner 39 to move therebetween. Draft links 43, which are pivotally connected to the runner 39 and to the front frame, allow free floating movement of one frame with respect to the other.

For connecting the forward frame to the crank member on the draft-bar, the arms of the arch 26 have clamped to them an angle iron cross-bar 44 (Figures 4 and 7) with which are associated end angle plates providing upright lugs 45, and secured to these end plates there are downwardly and rearwardly extending pick-up bars 46, which are bent upwardly at the ends and are located in the same vertical planes as the frame bars 32. Draft links 47 are pivotally connected to the side bars 32 and to the lugs 45 on the crank member.

At spaced points intermediate its ends, the lifting shaft 27 has mounted on it the elements of an auxiliary lifting mechanism comprising a forward lever 48 and a rear lever 49. These levers are vertical and are preferably of the forked construction shown by Figure 8 and are pivoted on shaft 27 between their ends, as there illustrated. The lower arm of the forward lever 48 has pivotally connected to it two connecting and lifting links 50 and 51, which are preferably adjustable in length. The link 50 passes through a pivoted collar mounted between upright bars 52 secured to the rear end of the forward implement frame and a coil spring 53, confined on link 50, engages opposite sides of the collar. Link 51 is similarly connected to inclined standards 54 on the front end of the rear frame. The lower arm of lever 49 has pivoted to it two connecting links 55, which preferably diverge, as shown by Figure 4, and are connected to standards 56 on the rear corners of the rear implement frame in the same manner as forward link 50. The upper arms of levers 48 and 49 are connected pivotally by a bar 57 and the upper arm of lever 49 is further pivotally connected by a bar 58 with a hand lever 59 pivoted on a sector bracket clamped on the rear axle. This lever is provided with the usual latch for locking it in adjusted position. Forward and backward movement of lever 59 will, therefore, rock the levers 48 and 49 and either tend to increase the spring pressure on the frames or tend to decrease that pressure and finally partly lift them from the ground, the lifting effort being assisted by a spring 60 connecting the upper arm of lever 48 with shaft 27.

In operation, the lever 59 will first be swung back, as in Figure 2, to relieve the spring pressure on the frames after which the lever 29 is swung forward to shift the lifting shaft 27 forwardly. This movement of shaft 27 will swing the arms 25 of the forward crank member upwardly and with them the pick-up bars 46. These will engage the lower edges of the frame bars 32, as shown by Figure 5, thereby lifting the front end of the frame as the draft links 47 are being lifted. At the same time, the levers 48 and 49 are carried forwardly, thereby exerting a pull on the connecting or lifting links 50, 51 and 55, and, as the upper arms of levers 48 and 49 are anchored to lever 59, the lower arms will swing upwardly and increase the upward pull. A high and level lift of the pivotally connected implement frames, as illustrated by Figure 2, is thus effected. Reverse movement of hand levers 29 and 59 will restore the frames to working position and leave both frames free to separately follow undulations in the ground traversed.

The structure accordingly provides novel and efficient means for drawing implements pivotally connected in tandem at the side of a tractor and for controlling the lift and adjustment of said frames simultaneously from the operator's station at the rear of the tractor.

What is claimed is:

1. The combination with a tractor of rowplanting means at the side thereof comprising a plurality of dispensing devices having carrying frames arranged in tandem relation and pivotally connected together for movement vertically, a pivotal draft connection between the forward frame and the front end of the tractor, and means controlled from the rear end of the tractor for simultaneously lifting and lowering the carrying frames.

2. The combination with a tractor of rowplanting means at the side thereof comprising a plurality of dispensing devices having carrying frames arranged in tandem relation and pivotally connected together for movement vertically, a pivotal draft connection between the forward frame and the front end of the tractor, means controlled from the rear end of the tractor for simultaneously lifting and lowering the carrying frames, and means incorporated in the lifting means for applying a variable downward spring pressure to the frames simultaneously.

3. The combination with a tractor of a ground engaging implement positioned at one side of the tractor and having a frame, a vertically shiftable draft connection between the front end of the tractor and the frame, means for shifting the draft connection vertically to lift and lower the front of the implement frame comprising a longitudinally shiftable adjusting shaft connected to the draft connection and supported on the rear end of the tractor, and auxiliary means for lifting and lowering the rear of the implement frame in unison with the front thereof by movement of said adjusting shaft comprising a vertical lever pivoted between its ends at an intermediate point on the adjusting shaft, a lifting link between one arm of said lever and the rear of the implement frame, and a secondary adjusting shaft connected to the other arm of said lever and adjustably anchored on the rear end of the tractor.

4. A self-propelled implement comprising a tractor, a laterally projecting draft member supported on the forward end of the tractor, a forward implement frame connected to the draft bar by a vertically shiftable draft connection, a rear implement frame connected to the forward frame by a transverse pivot, a longitudinally extending adjusting shaft above said frames and pivotally connected at its forward end to the draft connection for shifting the same and having its rear end mounted on the tractor for fore and aft shifting movement, and lifting connections between intermediate points on said shaft and longitudinally spaced points on each of the implement frames comprising longitudinally spaced levers pivoted on said shaft and connected by links to a fixed point on the tractor, whereby fore and aft movement of said shaft will cause the levers to swing and effect simultaneous vertical movements of both implement frames.

5. A self-propelled implement comprising a tractor, a laterally projecting draft member supported on the forward end of the tractor, pivotally connected tandem implement frames, a vertically shiftable draft connection between the draft member and the forward implement frame comprising a cranked member transversely pivoted on the draft member having a horizontal portion pivoted to the front end of said implement frame and having an upward extension, a longitudinally extending adjusting shaft above said frames having its forward end pivoted to said extension and having its rear end mounted on the tractor for fore and aft shifting movement, forward and rear upright levers pivoted between their ends on the adjusting shaft, an anchor bar pivotally connected to the upper arm of each lever and to the tractor, lifting links connected to the lower arm of the forward lever and respectively connected to the rear end of the forward implement frame and forward end of the rear frame, and a lifting link connecting the lower arm of the rear lever to the rear end of the rear frame.

WILLIAM L. BEALL.